US011964501B2

(12) United States Patent
Kawakita et al.

(10) Patent No.: US 11,964,501 B2
(45) Date of Patent: Apr. 23, 2024

(54) PRINTING DEVICE

(71) Applicant: BROTHER KOGYO KABUSHIKI KAISHA, Nagoya (JP)

(72) Inventors: Akihiro Kawakita, Nagoya (JP); Hisaaki Yoshimoto, Nukata-gun (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 57 days.

(21) Appl. No.: 17/489,950

(22) Filed: Sep. 30, 2021

(65) Prior Publication Data

US 2022/0097433 A1 Mar. 31, 2022

(30) Foreign Application Priority Data

Sep. 30, 2020 (JP) ................................ 2020-165850

(51) Int. Cl.
*B41J 29/377* (2006.01)
*B41J 2/045* (2006.01)

(52) U.S. Cl.
CPC ......... *B41J 29/377* (2013.01); *B41J 2/04566* (2013.01); *B41J 2/04586* (2013.01)

(58) Field of Classification Search
CPC ... B41J 29/377; B41J 2/04566; B41J 2/04586
See application file for complete search history.

(56) References Cited

U.S. PATENT DOCUMENTS

2007/0229611 A1* 10/2007 Nagashima .......... B41J 2/17563 347/84
2008/0246822 A1* 10/2008 Hara .................... B41J 2/16517 347/84
2011/0109689 A1* 5/2011 Sugimoto .............. B41J 29/377 347/25
2014/0368574 A1 12/2014 La Vos et al.

FOREIGN PATENT DOCUMENTS

JP 2005271314 A 10/2005
JP A-2010-005908 1/2010
JP 2011098521 A 5/2011
JP 2011104921 A 6/2011
JP 2018140530 A 9/2018

OTHER PUBLICATIONS

Office Action issued in related Japanese Patent Application No. 2020-165850, dated Jan. 9, 2024. (2 pages.).

* cited by examiner

*Primary Examiner* — Thinh H Nguyen
(74) *Attorney, Agent, or Firm* — K&L Gates LLP

(57) ABSTRACT

A printing device includes a housing, a head arranged inside the housing and configured to eject a liquid, a fan arranged inside the housing, a humidifier configured to supply humidified air to a supply port arranged at an exhaust port side of the fan, and a filter arranged at a fan side of the supply port.

8 Claims, 10 Drawing Sheets

FIG.2A
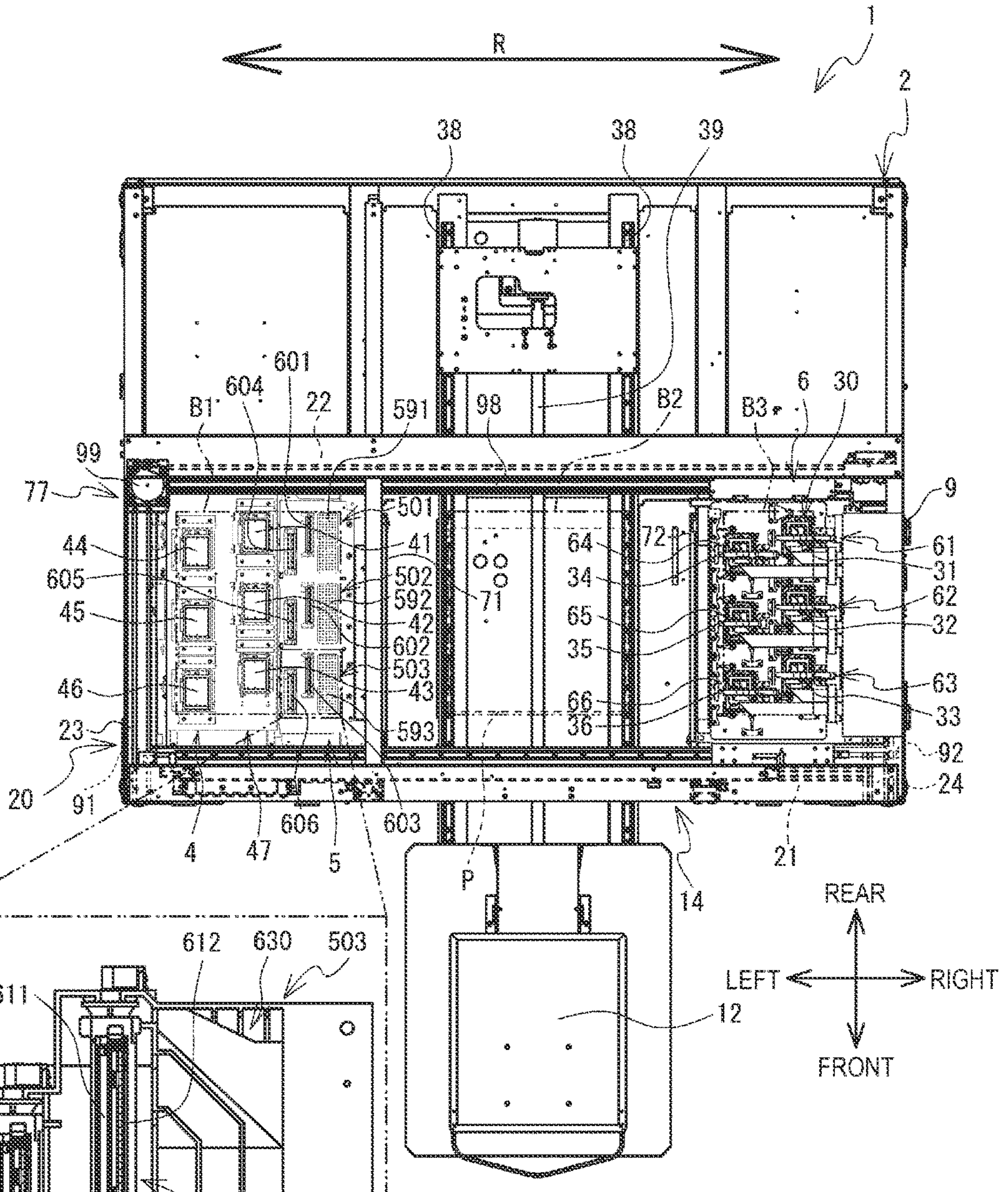
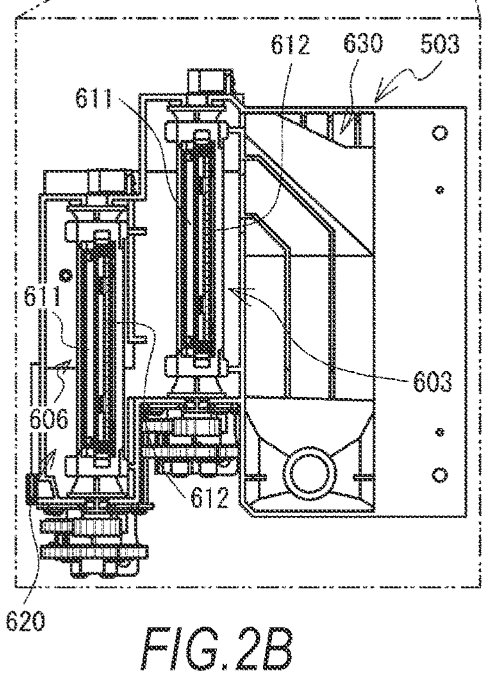
FIG.2B

FIG.3A
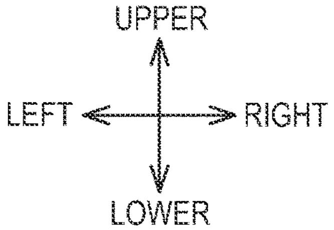
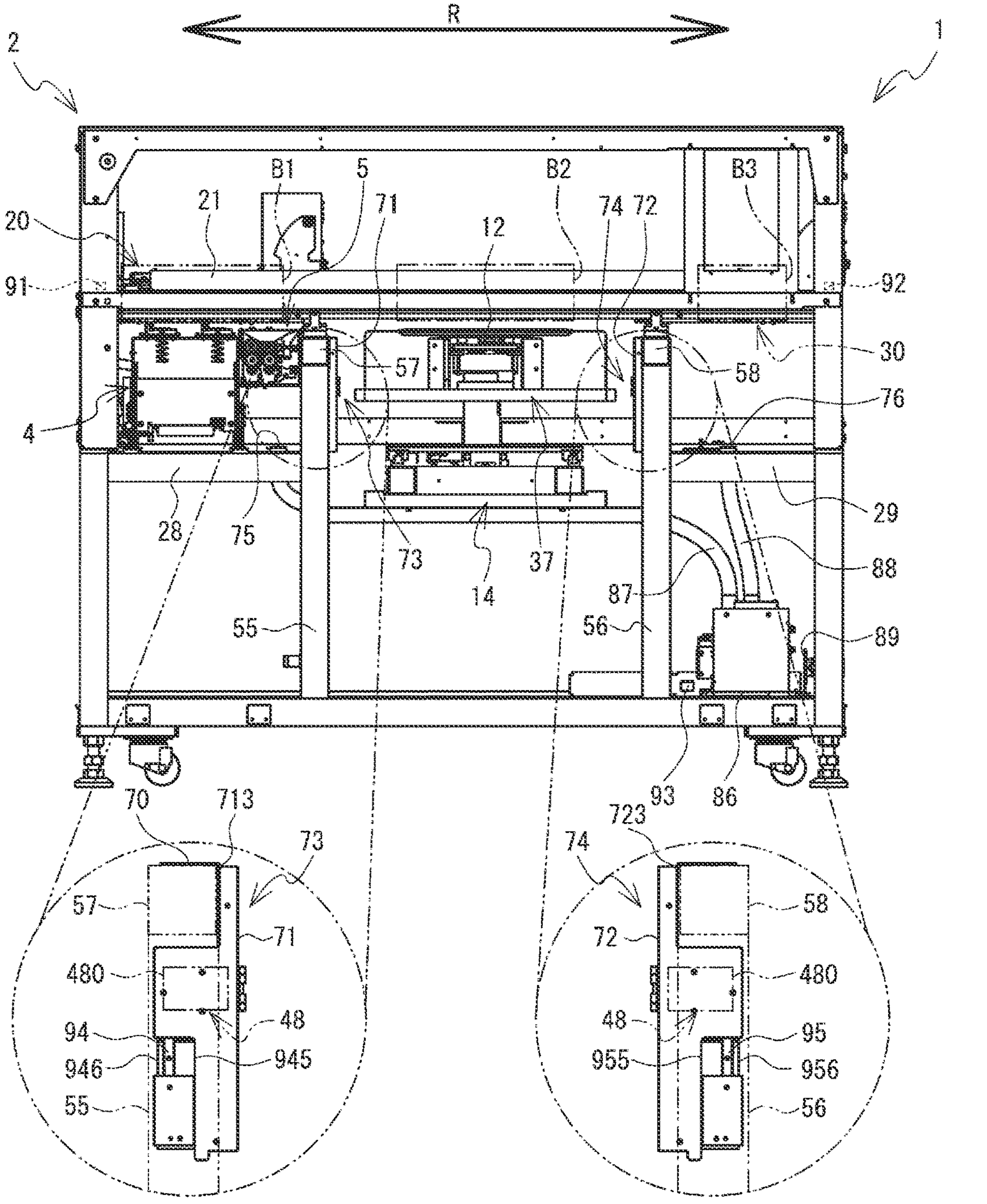
FIG.3B
FIG.3C

PRINTING DEVICE

CROSS-REFERENCE TO RELATED APPLICATION

This application claims priority from Japanese Patent Application No. 2020-165850 filed on Sep. 30, 2020, the content of which is incorporated herein by reference in its entirety.

BACKGROUND

The present disclosure relates to a printing device.

An inkjet type printing device in the related art includes a head, a housing, a fan and a filter. The head is accommodated in the housing. The fan is provided on a back surface of the housing, and discharges mist generated when a liquid is ejected from the head, to outside of the housing together with air inside the housing. The filter is attached to the back surface of the fan and collects the mist discharged to the outside of the housing.

SUMMARY

In a printing device of the related art, as a fan discharges air inside a housing to outside of the housing, inside of the housing has a negative pressure, and air outside the housing is supplied into the housing from an opening formed at a front surface of the housing. At this time, dust may be sucked into the housing together with the air outside the housing. In addition, since the air outside the housing is sent to vicinity of the head, a liquid in the head may be easily dried.

The present disclosure is related to a printing device capable of reducing dust introduced from outside of a housing into the housing when mist present inside the housing is collected, and preventing drying of a liquid inside a head as compared with a related-art printing device.

A printing device according to an aspect of the present disclosure includes: a housing; a head arranged inside the housing and configured to eject a liquid; a fan arranged inside the housing; a humidifier configured to supply humidified air to a supply port arranged on a side of an exhaust port of the fan; and a filter arranged at a fan side of the supply port. The filter is arranged on the fan side of the supply port. Thereby, the air supplied from the humidifier merges with the air sent from the exhaust port of the fan, and is sent to the head. Therefore, since the head is arranged in a humidification environment, drying of the liquid in the head can be prevented, and a possibility of occurrence of ejection failure of the liquid from the head can be reduced. In addition, the fan is arranged inside the housing. Thereby, when the humidifier and the fan are driven, due to the air sent from the exhaust port of the fan, a flow of the air from inside to outside of the housing is likely to be generated. Therefore, a possibility that dust or the like is sucked into the housing from the outside of the housing can be reduced. Further, the filter is arranged on the fan side of the supply port. Thereby, mist of the liquid ejected from the head is collected by the filter, so that the mist is less likely to be mixed with the humidified air supplied from the supply port. Therefore, it is possible to reduce a possibility that the head is contaminated by the mist as compared to a device in which the filter is not provided on the fan side of the supply port.

BRIEF DESCRIPTION OF THE DRAWINGS

FIG. 2A is a plan view showing an internal structure of the printing device 1.

FIG. 2B is an enlarged view of a cleaning mechanism 503 of FIG. 2A.

FIG. 3A is a front view showing the internal structure of the printing device 1.

FIGS. 3B and 3C are enlarged view of the mist collection mechanisms 73 and 74 of FIG. 3A.

DETAILED DESCRIPTION

Figure 1:
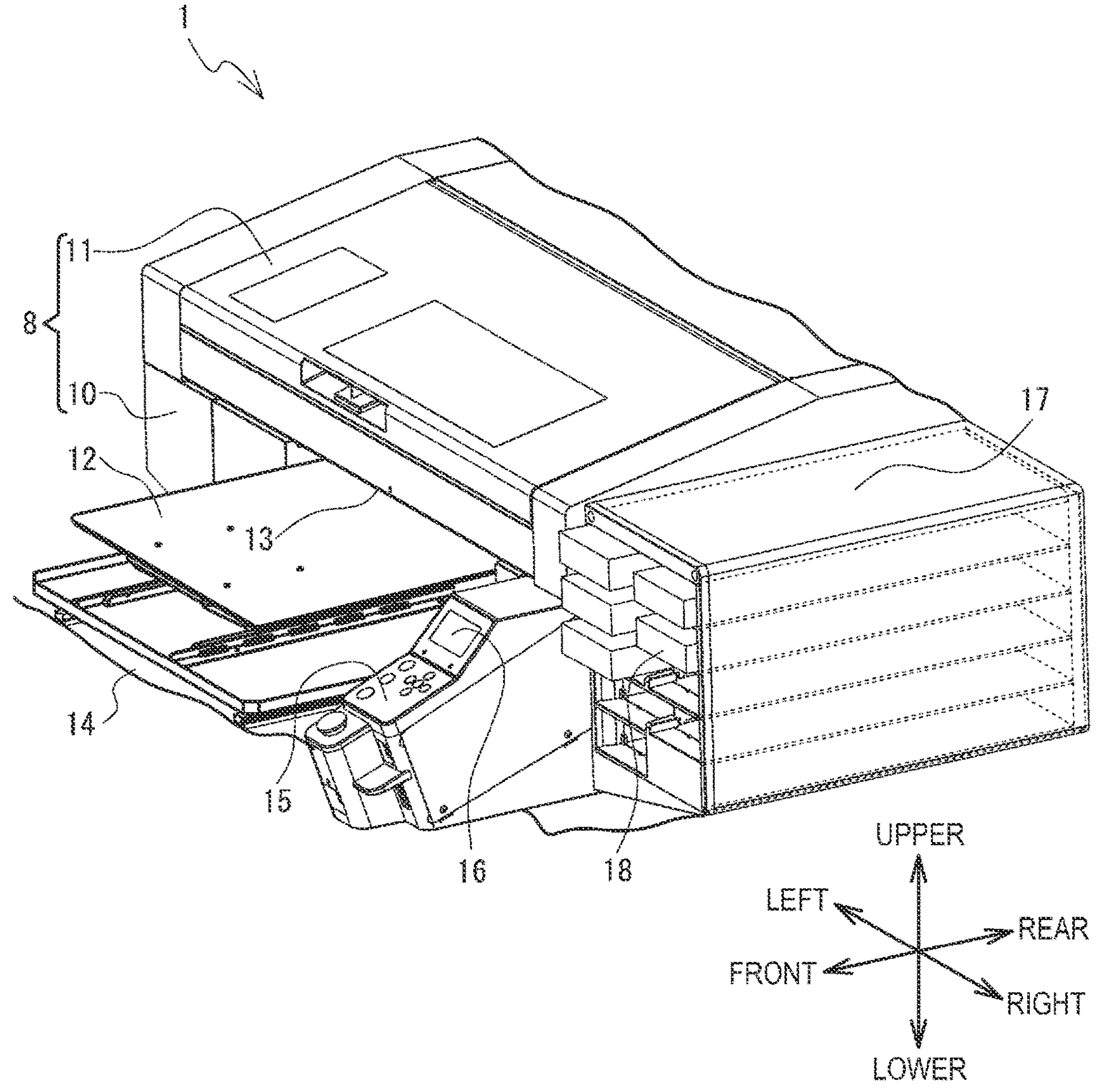
FIG. 1 is a perspective view of a part of a printing device 1.

A printing device 1 according to an embodiment of the present disclosure will be described with reference to the drawings. An upper side, a lower side, a lower left side, an upper right side, a lower right side and an upper left side in FIG. 1 respectively correspond to an upper side, a lower side, a front side, a rear side, a right side and a left side of the printing device 1. An upper-lower direction in FIG. 1 is a vertical direction. In the following description, a left-right direction may be referred to as a main scanning direction, and a front-rear direction may be referred to as a sub-scanning direction. In the present embodiment, mechanical elements in the drawings indicate actual scales.

The printing device 1 shown in FIG. 1 is an inkjet printer, and performs printing by ejecting ink onto a printing medium including cloth or paper. The printing device 1 may print a color image on the printing medium using white ink and color ink including black, yellow, cyan and magenta ink.

An external configuration of the printing device 1 will be described with reference to FIGS. 1, 2A and 2B. As shown in FIG. 1, the printing device 1 includes a housing 8, a conveyance mechanism 14, an operation button 15, a display screen 16 and a storage unit 17. The housing 8 has a rectangular parallelepiped shape, and includes a main body 10 and a lid 11. In the main body 10, a platen opening 13 having a rectangular shape in a front view is formed at a center of the housing 8 in a sub-scanning direction side, that is, at a center of a front surface of the housing 8 in the left-right direction. In the present embodiment, the sub-scanning direction is the front-rear direction. An internal position P described later is located behind the platen opening 13. The lid 11 is provided on an upper side of the main body 10 and movable between a position where an upper surface of the main body 10 is covered and a position where the upper surface of the main body 10 is opened by rotating about a rear end of the lid 11. Hereinafter, a space surrounded by the upper surface, a right surface, a bottom surface and a left surface of the housing 8 is referred to as inside of the housing 8.

The operation button 15 and the display screen 16 are provided on a right side of the platen opening 13 on the front surface of the housing 8. The operation button 15 inputs various types of information to the printing device 1 according to an operation by an operator. The display screen 16 displays the various types of information. Therefore, the operator operates the printing device 1 on a front side of the printing device 1.

The conveyance mechanism 14 conveys a platen 12, on which the printing medium is arranged, between the internal position P of the housing 8 and outside of the housing 8 through the platen opening 13. The platen 12 is arranged at the internal position P of the housing 8 shown in FIG. 2A, and a liquid is ejected from a head 30 described later to perform printing. As shown in FIG. 2A, the conveyance mechanism 14 includes a platen support portion 37 (see FIG. 3A), a pair of left and right rails 38, a transmission member 39 and a sub-scanning motor 26 (see FIG. 8). The platen support portion 37 supports the platen 12 from below. The platen 12 has a plate shape. The pair of left and right rails 38 extend in the front-rear direction and support the platen support portion 37 so as to be movable in the front-rear direction. Front ends of the pair of rails 38 are located forward than the front surface of the housing 8. The transmission member 39 is connected to the platen support portion 37 and the sub-scanning motor 26, and moves the platen support portion 37 in the front-rear direction along a conveyance path defined by the pair of left and right rails 38 in response to driving of the sub-scanning motor 26. In a state where the platen 12 is arranged in front of the front surface of the housing 8, that is, outside the housing 8, the operator arranges the printing medium on an upper surface of the platen 12. As shown in FIG. 2A, the storage unit 17 is provided on a right side of the housing 8. A plurality of cartridges 18 are stored in the storage unit 17 from a front side. The cartridges 18 contain various liquids such as ink used for printing.

An internal structure of the printing device 1 will be described with reference to FIGS. 2A to 7. As shown in FIG. 2A, the printing device 1 includes, inside the housing 8 shown in FIG. 1, a frame body 2, inner walls 71, 72 (see FIG. 3A), partition plates 28, 29 (see FIG. 3A), a carriage 6, heads 31 to 36, a substrate box 9, a movement mechanism 77, a first maintenance mechanism 4, a second maintenance mechanism 5, mist collection mechanisms 73, 74 (see FIG. 3A), a humidifier 86 (see FIG. 3A), and sensors 91 to 93 (see FIG. 3A).

As shown in FIG. 3A, the frame body 2 includes a plurality of shafts including shafts 57, 58 and extending in the front-rear direction, a plurality of shafts extending in the left-right direction, and a plurality of shafts including shafts 55, 56 and extending in the upper-lower direction. A guide shaft 20 is fixed to an upper end of the frame body 2. As shown in FIG. 2A, the guide shaft 20 includes a front shaft 21, a rear shaft 22, a left shaft 23 and a right shaft 24.

The front shaft 21 is arranged at a front end portion of the frame body 2, and extends in the left-right direction from a left end portion to a right end portion of the frame body 2. The rear shaft 22 is arranged substantially at a center of the frame body 2 in the front-rear direction, and extends in the left-right direction from the left end portion to the right end portion of the frame body 2. The left shaft 23 is arranged at the left end portion of the frame body 2, and extends in the front-rear direction from a left end of the front shaft 21 to a left end of the rear shaft 22. The right shaft 24 is arranged at the right end portion of the frame body 2, and extends in the front-rear direction from a right end of the front shaft 21 to a right end of the rear shaft 22. The front shaft 21 and the rear shaft 22 support the carriage 6. The conveyance mechanism 14 is fixed to the frame body 2.

As shown in FIG. 3A, the inner walls 71, 72 are arranged to face each other in the main scanning direction intersecting the sub-scanning direction at the internal position P of the housing 8. The inner walls 71, 72 extend in the front-rear direction below the guide shaft 20 and are fixed to the frame body 2. The inner wall 71 is provided on a left side of the platen 12 arranged at the internal position P, and is fixed to the shaft 57. The inner wall 72 is provided on a right side of the platen 12 arranged at the internal position P, and is fixed to the shaft 58. The inner walls 71, 72 are located between the front shaft 21 and the rear shaft 22 in the front-rear direction.

Figure 7:
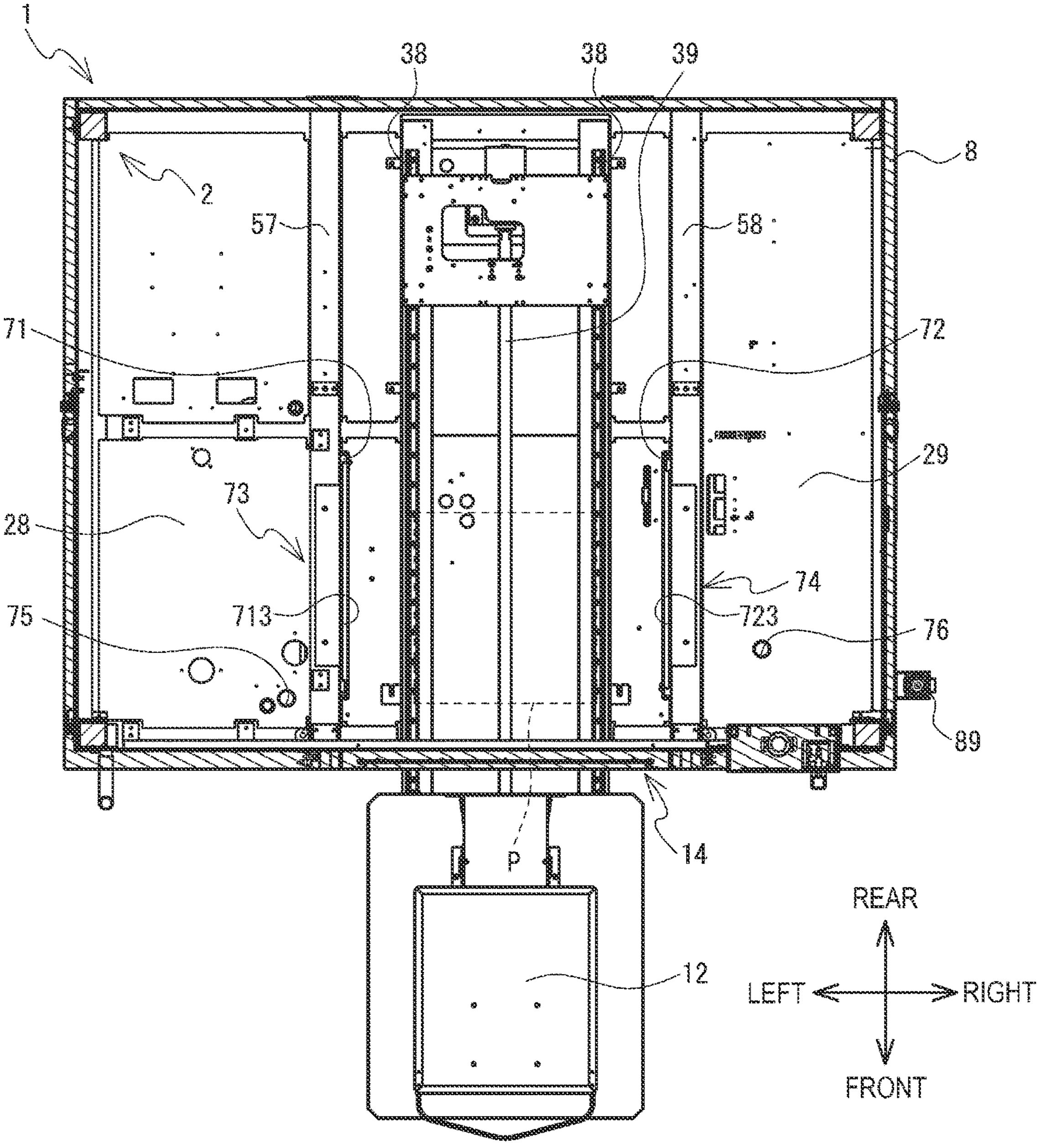
FIG. 7 is a cross-sectional view showing partition plates 28, 29 of the printing device 1 in which a first maintenance mechanism 4 and a second maintenance mechanism 5 are omitted.

The partition plate 28 is fixed to the frame body 2 below the guide shaft 20 and on a left side of the inner wall 71, and extends in the front-rear and left-right directions. A right end portion of the partition plate 28 is connected to a lower end portion of the inner wall 71. The partition plate 29 is fixed to the frame body 2 below the guide shaft 20 and on a right side of the inner wall 72, and extends in the front-rear and left-right directions. A left end portion of the partition plate 29 is connected to a lower end portion of the inner wall 72. As shown in FIG. 7, a supply port 75, which has a circular shape in a plan view and penetrates the partition plate 28 in the upper-lower direction, is formed in a right front portion of the partition plate 28. A supply port 76, which has a circular shape in a plan view and penetrates the partition plate 29 in the upper-lower direction, is formed in a left front portion of the partition plate 29. A positional relationship between the supply port 75 and the supply port 76 is not particularly limited, but in the present embodiment, the supply port 75 is formed in front of the supply port 76 in the front-rear direction.

As shown in FIG. 2A, the carriage 6 is supported by the front shaft 21 and the rear shaft 22 so as to be movable in the main scanning direction. The carriage 6 is provided with mounting portions 61 to 66. The heads 31 to 36 are mounted on the mounting portions 61 to 66, respectively. The mounting portions 61, 62, 63 are arranged at a right portion of the carriage 6, and are arranged in a row from a rear side to a front side in an order of the mounting portions 61, 62, 63. The mounting portions 64, 65, 66 are arranged on a left side of the row of the mounting portions 61, 62, 63, and are arranged in a row from a rear side to a front side in an order of the mounting portions 64, 65, 66.

Each of the heads 31 to 36 is arranged inside the housing 8 and ejects a liquid. Each of white ink and color ink may be ejected from any one of the heads 31 to 36. In the present embodiment, the white ink is supplied to each of the heads 31, 34 from the white ink cartridge 18. A discharge printing agent is supplied to each of the heads 32, 35 from the discharge printing agent cartridge 18. The discharge printing agent is a liquid for discharging a color of the printing medium. The color ink is supplied to each of the heads 33, 36 from the color ink cartridge 18. Each of the heads 31 to 36 ejects the liquid downward when the heads 31 to 36 are at a printing position B2 described later. Hereinafter, when the heads 31 to 36 are collectively referred to, or when any of the heads 31 to 36 is not specified, the heads 31 to 36 are referred to as the head 30.

The movement mechanism 77 moves the carriage 6, on which the head 30 is mounted, in the main scanning direction. The movement mechanism 77 includes a drive belt 98 and a main scanning motor 99. The drive belt 98 is connected to a rear end portion of the carriage 6. The drive belt 98 is provided on the rear shaft 22 and extends in the left-right direction. A left end portion of the drive belt 98 is connected to the main scanning motor 99. When the main scanning motor 99 is driven, the drive belt 98 moves the carriage 6 in the left-right direction along the front shaft 21 and the rear shaft 22.

In FIGS. 2A, 2B and 3, a movement range R of the head 30 is indicated by using a center of the carriage 6 in the left-right direction. As shown in FIG. 3A, the head 30 is mainly arranged at one of three positions including a maintenance position B1, the printing position B2 and a head standby position B3, by the movement mechanism 77. The maintenance position B1 is located at a left end portion of the movement range R of the head 30, and is a position where the head 30 is maintained by the first maintenance mechanism 4 or the second maintenance mechanism 5 described later. The printing device 1 moves the head 30 to the maintenance position B1 when printing is not performed, and performs maintenance by the first maintenance mechanism 4 or the second maintenance mechanism 5. The second maintenance mechanism 5 is located on a right side of the first maintenance mechanism 4. The printing position B2 is a position between the maintenance position B1 and the head standby position B3 in the main scanning direction and above the platen 12 arranged at the internal position P. When the head 30 is arranged at the printing position B2, the head 30 ejects the liquid according to print data, and printing is performed on the printing medium placed on the platen 12. The head standby position B3 is located at a right end portion of the movement range R of the head 30, and is a position where the head 30 is arranged when the operator performs an operation such as cleaning on the head 30. For example, the printing device 1 moves the head 30 to the head standby position B3 and causes the head 30 to stand by according to an instruction based on the operation button 15 when printing is not performed.

The first maintenance mechanism 4 is provided at a position facing the head 30 arranged at the maintenance position B1 to maintain the head 30. The first maintenance mechanism 4 is provided on the partition plate 28 on the left side of the inner wall 71 in the housing 8 and below the guide shaft 20. As shown in FIG. 2A, the first maintenance mechanism 4 includes six caps 41 to 46 and a cap support portion 47. A sponge containing a moisturizing liquid is arranged inside each of the caps 41 to 46. A positional relationship of the caps 41 to 46 is the same as a positional relationship of the mounting portions 61 to 66. Each of the caps 41 to 46 has a rectangular shape in a plan view, and is supported from below by the cap support portion 47. The cap support portion 47 can move the caps 41 to 46 in the upper-lower direction. When printing is not performed, the printing device 1 moves the cap support portion 47 upward in a state where the head 30 is located at the maintenance position B1. Thereby, the caps 41 to 46 cover and cap nozzle surfaces of the heads 31 to 36 from below. As a result, drying of the ink or the discharge printing agent in a nozzle provided on the nozzle surface of the head 30 can be prevented.

The second maintenance mechanism 5 is provided at a position facing the head 30 arranged at the maintenance position B1 to maintain the head 30. As shown in FIG. 3A, the second maintenance mechanism 5 is provided on the partition plate 28 on the left side of the inner wall 71 in the housing 8 and below the guide shaft 20. The second maintenance mechanism 5 is located between the first maintenance mechanism 4 and the inner wall 71 in the main scanning direction. The second maintenance mechanism 5 is a mechanism that cleans the head 30 by performing wiping and flushing operations on the nozzle surface of the head 30.

As shown in FIG. 2A, the second maintenance mechanism 5 includes cleaning mechanisms 501 to 503. The cleaning mechanisms 501 to 503 are located on a right side of the caps 41 to 43, respectively. The cleaning mechanisms 501 to 503 have the same structure. The cleaning mechanism 501 includes wipers 601, 604 and a punching metal 591. The cleaning mechanism 502 includes wipers 602, 605 and a punching metal 592. FIG. 2B is an enlarged view of the cleaning mechanism 503 of FIG. 2A. As shown in FIG. 2B, the cleaning mechanism 503 includes a wiper 603 and a wiper 606. Each of the cleaning mechanisms 501 to 503 further includes a cleaning liquid tank 620 and a flushing box 630. In FIG. 2B, the punching metal 593 is not shown.

The wipers 601 to 606 wipe the nozzle surfaces of the heads 31 to 36, respectively. Each of the wipers 601 to 606 includes a foam wiper 611 and a rubber wiper 612. The foam wiper 611 is configured to be vertically reversed by a vertical reversing mechanism (not shown) or the like, and to be capable of entering the cleaning liquid tank 620. Therefore, the foam wiper 611 is moistened by a cleaning liquid. The flushing box 630 is provided below each of the punching metals 591 to 593, and receives the liquid that is ejected from the head 30 by a flushing operation and passes through each of the punching metals 591 to 593.

As shown in FIG. 3A, the mist collection mechanisms 73, 74 collect mist generated when the liquid is ejected from the head 30. In the main scanning direction, the mist collection mechanism 73 is provided on a left side of the conveyance mechanism 14 inside the housing 8 (see FIG. 1), and the mist collection mechanism 74 is provided on a right side of the conveyance mechanism 14 inside the housing 8. Since the mist collection mechanisms 73, 74 have configurations symmetrical to each other, the configuration of the mist collection mechanism 73 will be described below, and description of the mist collection mechanism 74 will be omitted.

Figure 4A:
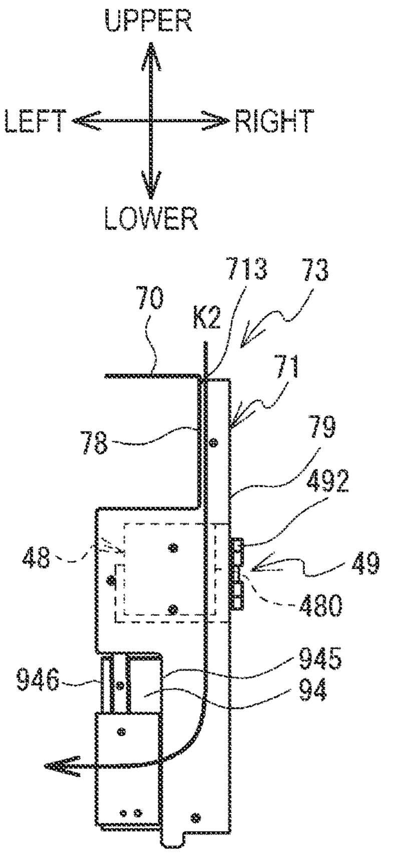
FIGS. 4A and 4B are front views showing opening and closing of an accommodating portion 49 of a mist collection mechanism 73.
Figure 4B:
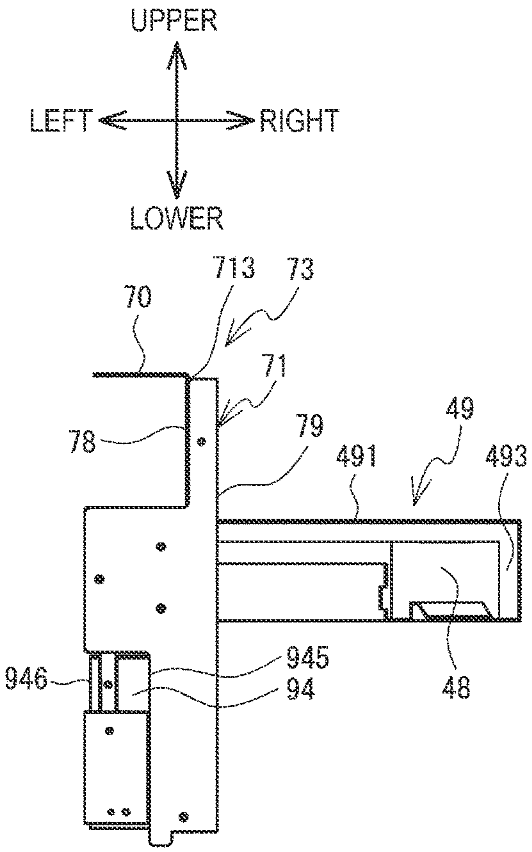
Figure 5A:
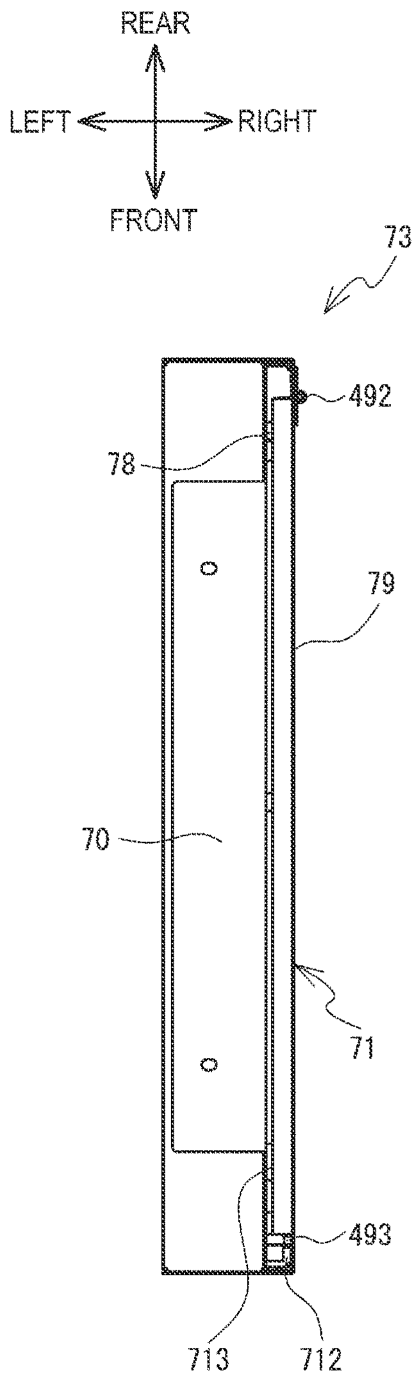
FIGS. 5A and 5B are plan views showing the opening and closing of the accommodating portion 49 of the mist collection mechanism 73.
Figure 5B:
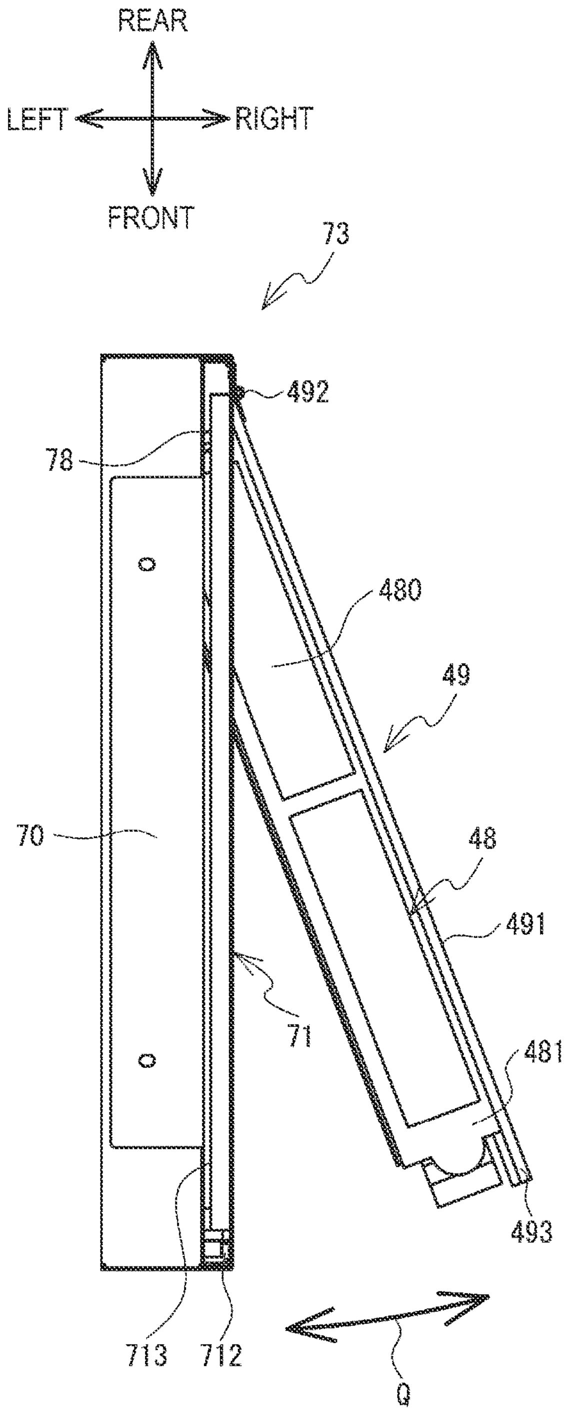
Figure 6:
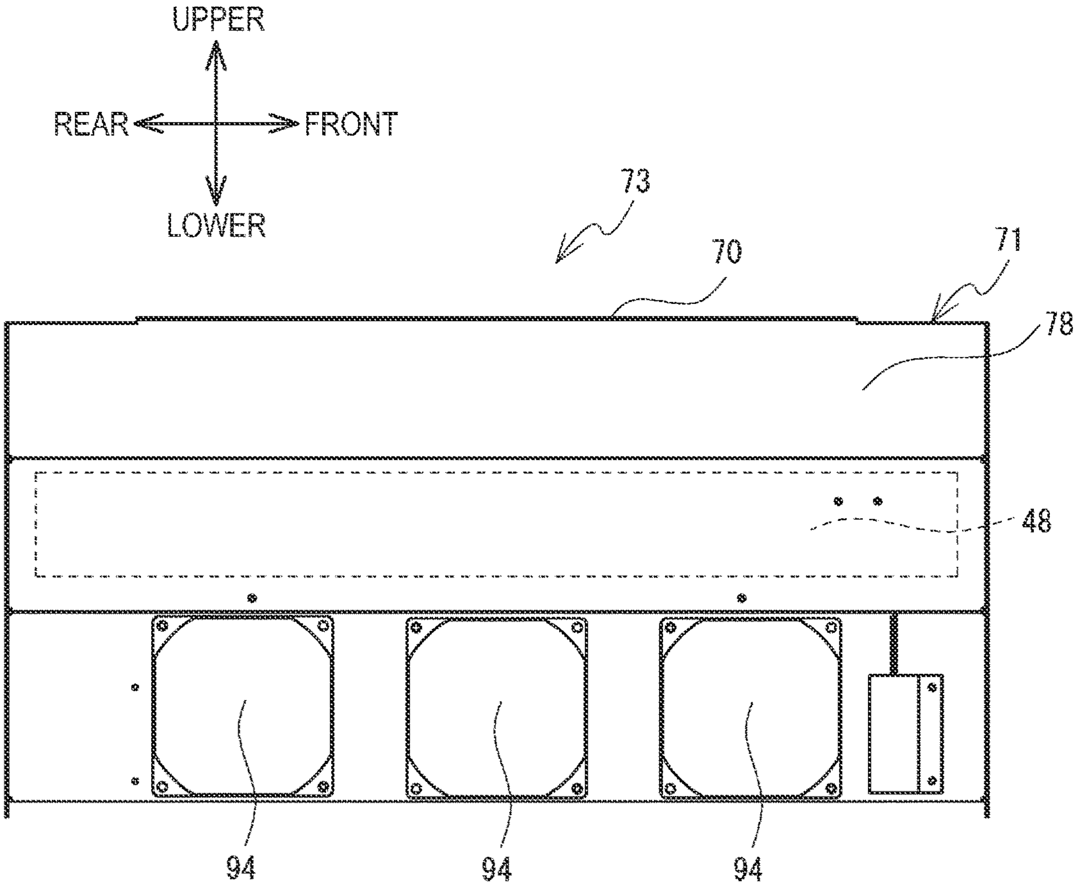
FIG. 6 is a left side view of the mist collection mechanism 73.

As shown in FIGS. 4 to 6, the mist collection mechanism 73 includes the inner wall 71, three fans 94 (see FIG. 6) and a filter unit 48. The inner wall 71 has a hollow box shape. A right surface 79 of the inner wall 71 has a plate shape extending in the upper-lower and front-rear directions. A slit-shaped suction port 713 elongated in the front-rear direction is formed in an upper surface of the inner wall 71.

As shown in FIGS. 4 and 5, the inner wall 71 includes a fixing plate 70 and an accommodating portion 49. The fixing plate 70 is a plate-shaped portion extending in the left-right direction at an upper end of the inner wall 71. As shown in FIG. 3B, the fixing plate 70 is fixed to the shaft 57 extending in the front-rear direction. As shown in FIGS. 4 and 5, the accommodating portion 49 has a box shape, and detachably accommodates the filter unit 48 having a rectangular parallelepiped shape elongated in the front-rear direction inside the inner wall 71. The filter unit 48 includes a filter 480 and a support 481. The accommodating portion 49 is provided so as to be openable and closable with respect to the right surface 79 of the inner wall 71 in a direction indicated by an arrow Q (see FIG. 5B) by a hinge 492 connected to a rear end portion of the right surface of the inner wall 71 and a rear end portion of a right surface of a main body 491 of the accommodating portion 49. An engaging portion 493 is provided at a right front portion of the accommodating portion 49, and engages with an engaged portion 712 provided at a front end portion of the right surface 79 of the inner wall 71 so as not to be opened and closed without an operation of the operator.

The three fans 94 shown in FIG. 6 are arranged inside the housing 8 (see FIG. 1). The three fans 94 are arranged at a liquid ejection direction side (that is, downward) from the head 30. For example, the fan 94 may be arranged below the front shaft 21 and the rear shaft 22. The three fans 94 are provided at a lower portion of a left surface 78 of the inner wall 71. The three fans 94 are arranged at substantially equal intervals in the front-rear direction, and have the following configuration. As shown in FIG. 3B, a suction port 945 of the fan 94 is located on a right side of the fan 94, and an exhaust port 946 of the fan 94 is located on a left side of the fan 94. That is, the suction port 945 is located on a side of the platen 12 arranged at the internal position P from the fan 94, and the exhaust port 946 is located on a left surface side of the housing 8 and on a side of the first maintenance mechanism 4 and the second maintenance mechanism 5 from the fan 94. Therefore, the exhaust port 946 of the fan 94 is located inside the housing 8. The fan 94 is arranged between the inner wall 71 and the supply port 75 in the main scanning direction. The suction port 945 of the fan 94 is connected to the lower portion of the left surface 78 of the inner wall 71.

The filter 480 is arranged on a fan side from the supply port 75. For example, the filter 480 may be located in a path in the housing 8 from the exhaust port 946 of the fan 94 toward the supply port 75, and more preferably, the filter 480 is arranged in a path in the housing 8 from the head 30 toward the suction port 945 of the fan 94. The filter 480 adsorbs and collects the mist in the air. The filter 480 is, for example, a resin filter in which a plurality of minute holes are formed, and the mist is adsorbed on a surface of the filter 480. The filter 480 has a rectangular parallelepiped shape extending in the front-rear direction. In general, since a filter having only small holes has high mist collection performance, the holes are more likely to be clogged with the mist and the collection performance decreases in a relatively short time, compared to a filter having large holes. In contrast, in the filter 480, it is desirable that an average size of minute holes of the filter 480 becomes smaller toward a downstream side of a flow of the air taken into the inner wall 71 from the suction port 713 by driving of the fan 94. Thereby, a time for which collection performance of the filter 480 decreases is prolonged while increasing a collection rate of the mist by the filter 480. The support 481 is a frame body and supports the filter 480.

The suction port 713 is closer to a mist generation source, that is, the head 30 at the printing position B2 than the suction port 945 of the fan 94. As shown in FIG. 4A, in the mist collection mechanism 73, when each fan 94 is driven, the air sucked into the inner wall 71 from the suction port 713 of the inner wall 71 passes through the filter unit 48, so that the filter 480 adsorbs and collects the mist in the air. The air that has passed through the filter 480 and from which the mist has been collected is discharged from a space inside the inner wall 71 from the suction port 945 of the fan 94 via the exhaust port 946. That is, when the fan 94 is driven, the air flows in a space surrounded by the right surface 79 and the left surface 78 of the inner wall 71 as indicated by an arrow K2.

In the mist collection mechanism 73, when the filter 480 is replaced, the operator operates the engaging portion 493 in a state where the platen 12 is arranged outside the housing 8. Thereby, engagement with the engaged portion 712 (see FIG. 5B) is released, and the accommodating portion 49 rotates about the hinge 492. The operator removes the used filter 480, fits the unused filter 480 into the main body 491, and then operates the engaging portion 493. Thereby, the accommodating portion 49 rotates about the hinge 492, and as shown in FIGS. 4A and 5A, the engaging portion 493 engages with the engaged portion 712, and the main body 491 is accommodated in the inner wall 71.

As shown in FIG. 3C, the mist collection mechanism 74 includes the inner wall 72, three fans 95 (only one of which is shown in FIG. 3C) and the filter unit 48, corresponding to the inner wall 71, the three fans 94 and the filter unit 48 of the mist collection mechanism 73, respectively. A slit-shaped suction port 723 elongated in the front-rear direction (see FIG. 7) and corresponding to the suction port 713 is formed in an upper surface of the mist collection mechanism 74. When each fan 95 is driven, the air flows through a space inside the inner wall 72 as indicated by an arrow K12 (see FIG. 9). Specifically, when each fan 95 is driven, the air sucked from the suction port 723 passes through the filter 480 of the filter unit 48, and then is sent from a side of a suction port 955 of the fan 95 to a side of an exhaust port 956 of the fan 95.

The humidifier 86 shown in FIG. 3A supplies humidified air to the supply port 75 arranged on a side of the exhaust port 946 of the fan 94 (a left side of the fan 94). The humidifier 86 supplies the humidified air to the supply port 76 arranged on the side of the exhaust port 956 of the fan 95 (a right side of the fan 95). A position where the humidifier 86 is arranged is not particularly limited, but the humidifier 86 is provided inside the housing 8 and below the partition plate 29. The humidifier 86 includes a storage unit 860 (see FIG. 8), a humidification drive unit 861 (see FIG. 8), a suction port 89, tubes 87, 88, and fans 862, 863 (see FIG. 8). The storage unit 860 stores a liquid (for example, water) used for humidification. A water supply pipe may be connected to the storage unit 860, and, for example, water may be supplied to the storage unit 860 from a water tap or an external device such as a water supply tank (not shown).

The suction port 89 is attached to a right side surface of the housing 8, and takes the air into the humidifier 86 from the outside of the housing 8. The humidification drive unit 861 humidifies the air taken into the humidifier 86 from the outside of the housing 8 via the suction port 89 using the liquid stored in the storage unit 860. The humidification drive unit 861 may humidify the air by any method such as a steam method, a vaporization method, an ultrasonic method and an electrolysis method. The humidifier 86 may include a filter that removes dust and the like in the air in a flow path of the air before humidification, such as between the suction port 89 and the storage unit 860 (see FIG. 8). One end of the tube 87 is connected to the humidifier 86, and the other end thereof is connected to the supply port 75. The supply port 75 is located below the head 30 arranged on a left end side of the movement range R. One end of the tube 88 is connected to the humidifier 86, and the other end thereof is connected to the supply port 76. The supply port 76 is located below the head 30 arranged on a right end side of the movement range R.

Figure 8:
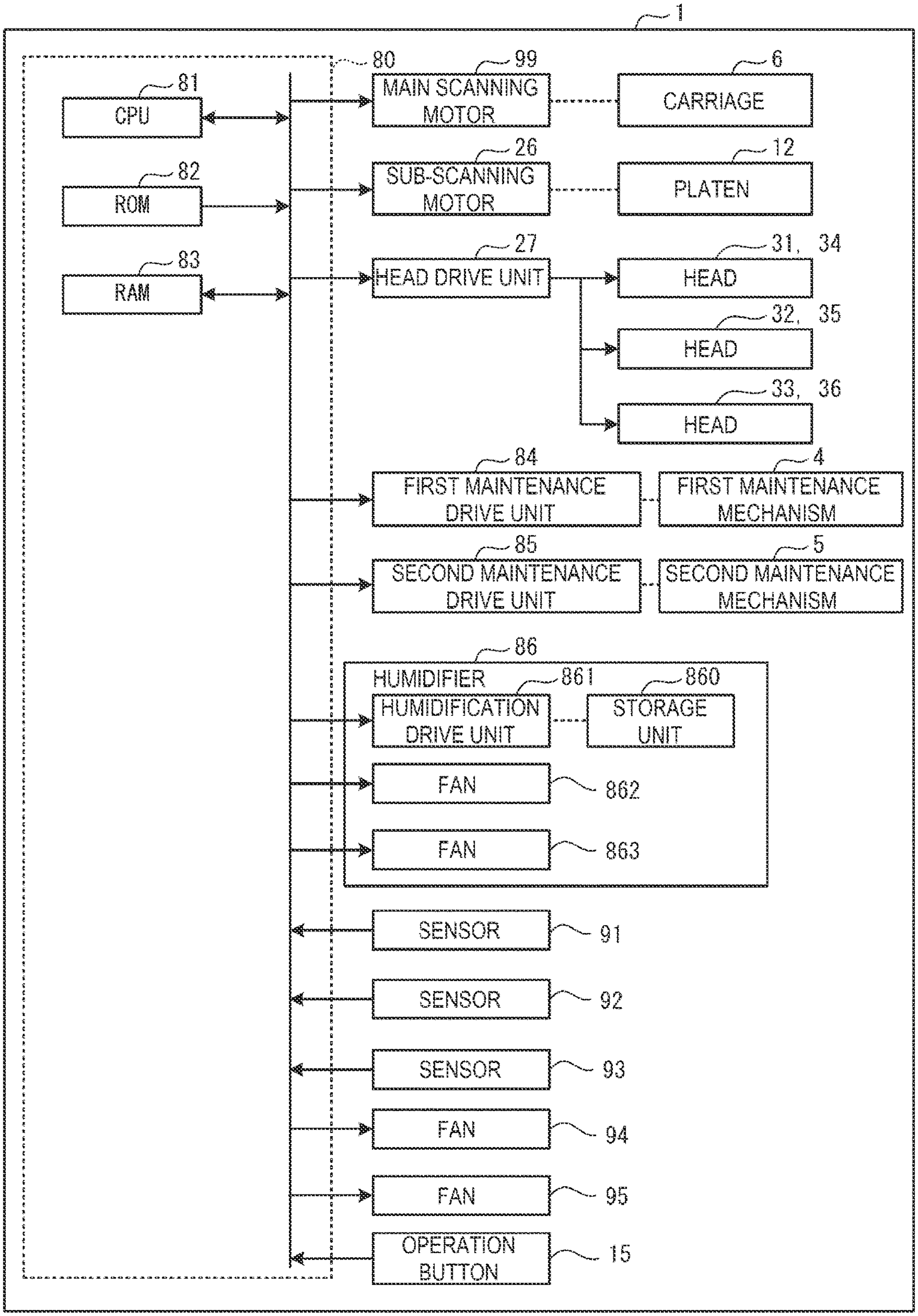
FIG. 8 is a block diagram showing an electrical configuration of the printing device 1.

The fan 862 shown in FIG. 8 supplies the air humidified by the humidification drive unit 861 to the supply port 75 via the tube 87 shown in FIG. 3A. The humidified air supplied to the supply port 75 is sent toward the head 30 through a space (left side space) on the left side of the inner wall 71 inside the housing 8 and above the partition plate 28. The fan 863 shown in FIG. 8 supplies the air humidified by the humidification drive unit 861 to the supply port 76 via the tube 88 shown in FIG. 3A. The humidified air supplied from the supply port 76 is sent toward the head 30 inside the housing 8 through a space (right side space) on the right side of the inner wall 72 inside the housing 8 and above the partition plate 29. In the printing device 1, since an internal space thereof is partitioned into upper and lower spaces by the partition plates 28, 29, the humidified air supplied to the supply ports 75, 76 by the humidifier 86 is easily directed to the head 30.

As shown in FIG. 3A, the sensors 91 to 93 are provided inside the housing 8 and detect at least one of a humidity and a temperature inside the housing 8, but each of the sensors 91 to 93 according to the present embodiment detects both the temperature and the humidity inside the housing 8. The sensors 91, 92 are provided corresponding to the supply ports 75, 76, respectively. For example, as shown in FIGS. 2A to 3C, the sensor 91 is arranged on a left side of the front shaft 21 and in vicinity of an upper side of the supply port 75, and the sensor 92 is arranged on a right side of the front shaft 21 and in vicinity of an upper side of the supply port 76. As shown in FIG. 3A, the sensor 93 is arranged below the partition plate 29 and on a left side of the humidifier 86, and detects a temperature and a humidity of atmosphere around the humidifier 86, that is, non-humidified atmosphere not humidified by the humidifier 86.

According to the above configuration, the printing device 1 conveys the printing medium in the front-rear direction and the left-right direction with respect to the head 30 by moving the platen 12 in the front-rear direction (the sub-scanning direction) by driving the sub-scanning motor 26 and moving the carriage 6 in the left-right direction (the main scanning direction) by driving the main scanning motor 99. The printing device 1 ejects various types of liquid from the head 30 while conveying the printing medium in the front-rear direction and the left-right direction with respect to the head 30. Specifically, the printing device 1 first ejects the discharge printing agent from the heads 32, 35 to discharge the color from the printing medium. Alternatively, the printing device 1 first forms a base on the printing medium by ejecting the white ink from the heads 31, 34. The printing device 1 prints a color image by ejecting the color ink from the heads 33, 36 onto a portion of the printing medium from which the color is discharged or the formed base. The printing device 1 may eject both the white ink and the discharge printing agent.

An electrical configuration of the printing device 1 will be described with reference to FIG. 8. As shown in FIG. 8, a control unit 80 of the printing device 1 includes a CPU 81, a ROM 82 and a RAM 83. The CPU 81 is electrically connected to the ROM 82 and the RAM 83, and controls the printing device 1. The ROM 82 stores a control program for the CPU 81 to control an operation of the printing device 1, information required by the CPU 81 when various programs are executed, and the like. The RAM 83 temporarily stores various types of data used in the control program, print data for printing on the printing medium, and the like. Some of these electrical elements are provided in the substrate box 9 provided on a right side of the head 30.

The main scanning motor 99, the sub-scanning motor 26, a head drive unit 27, a first maintenance drive unit 84, a second maintenance drive unit 85, the humidifier 86, the sensors 91 to 93, the fans 94, 95 and the operation button 15 are electrically connected to the CPU 81. The main scanning motor 99 is driven to move the carriage 6 in the main scanning direction. The sub-scanning motor 26 is driven to move the platen 12 in the sub-scanning direction. Thereby, the head 30 (see FIG. 2A) moves relative to the platen 12 in the main scanning direction and the sub-scanning direction. The head drive unit 27 is configured by a pressure element or the like, and is driven to eject the white ink from the heads 31, 34, eject the discharge printing agent from the heads 32, 35, or eject the color ink from the heads 33, 36.

The first maintenance drive unit 84 can move the cap support portion 47 (see FIG. 2A) in the upper-lower direction. The second maintenance drive unit 85 can change positions of the wipers 601 to 606 (see FIG. 2A) between a contact position and a non-contact position. Each of the sensors 91 to 93 detects the temperature and the humidity inside the housing 8, and outputs a detection result to the CPU 81. The CPU 81 can determine whether the detection result satisfies a predetermined ejection condition based on the detection result from each of the sensors 91 to 93. The operation button 15 is operated by the operator and outputs a signal corresponding to the operation to the CPU 81. The operator can input, for example, a printing instruction for starting printing to the printing device 1 by operating the operation button 15.

Figure 9:
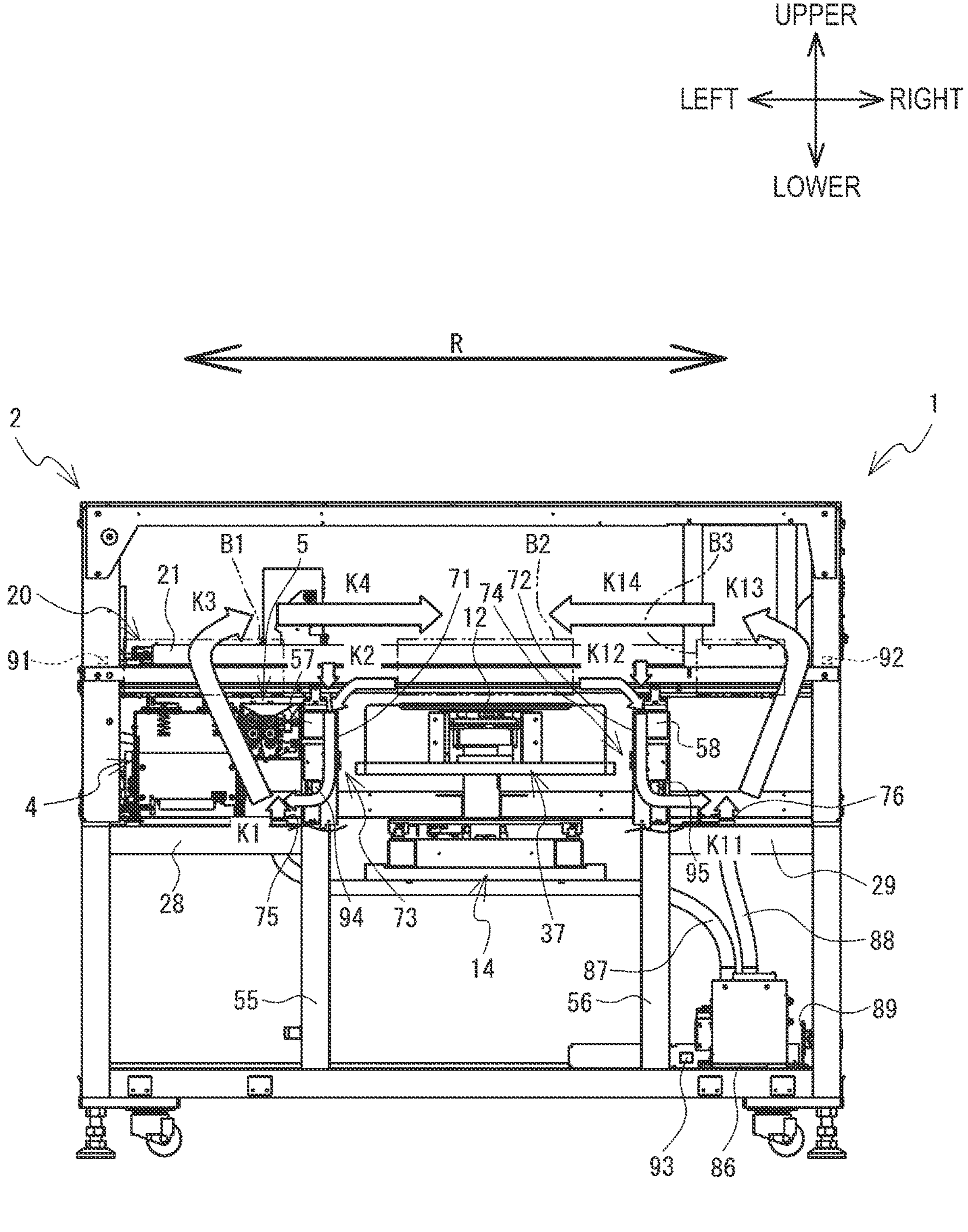
FIG. 9 is an explanatory view of air flow in the printing device 1 when fans 94, 95, 862, 863 are driven.

A flow of air inside the housing 8 when the CPU 81 of the printing device 1 drives the fans 94, 95 and the humidifier 86 (see FIG. 1) will be described with reference to FIG. 9. When the CPU 81 drives the fans 94, 95 and the humidifier 86, the humidified air flowing from the humidifier 86 toward the supply port 75, which is indicated by an arrow K1, and the air discharged from the exhaust port 946 of the fan 94 (see FIG. 3B), which is indicated by an arrow K2, merge with each other on the left side of the inner wall 71 inside the housing 8. The humidified air merged with the air discharged from the exhaust port 946 moves leftward and upward in a left side space between the left surface of the housing 8 and the inner wall 71 as indicated by an arrow K3.

The humidified air moves rightward along the upper surface of the housing 8 above the guide shaft 20 as indicated by an arrow K4. A part of the humidified air is sucked into the inner wall 71 from the suction port 713 (see FIG. 3B), and the rest of the humidified air is discharged to the outside of the housing 8 from the platen opening 13 (see FIG. 1). That is, the humidified air supplied from the supply port 75 merges with the air discharged from the exhaust port 946 of the fan 94 (see FIG. 3B), and moves as indicated by the arrows K3, K4, whereby the nozzle surfaces of the heads 31 to 36 shown in FIG. 2A are humidified, and drying of the liquid inside the nozzle provided in the head 30 can be prevented. It is also possible to prevent drying of the foam wiper 611 moistened by the sponge containing the moisturizing liquid arranged inside each of the caps 41 to 46 of the first maintenance mechanism 4 and the cleaning liquid of the second maintenance mechanism 5.

Similarly, in a right side space on the right side of the inner wall 72 inside the housing 8, air flows indicated by arrows K11 to K13 respectively corresponding to the arrows K1 to K3 are generated. The humidified air moves leftward along the upper surface of the housing 8 above the guide shaft 20 as indicated by an arrow K14. A part of the humidified air is sucked from the suction port 723 (see FIG. 7), and the rest of the humidified air is discharged to the outside of the housing 8 from the platen opening 13. The humidified air supplied from the supply port 76 merges with the air discharged from the exhaust port 956 of the fan 95 (see FIG. 3C), and moves as indicated by the arrows K13, K14, thereby humidifying atmosphere in vicinity of the right end portion of the movement range R of the head 30 and the nozzle surfaces of the heads 31 to 36.

Figure 10:
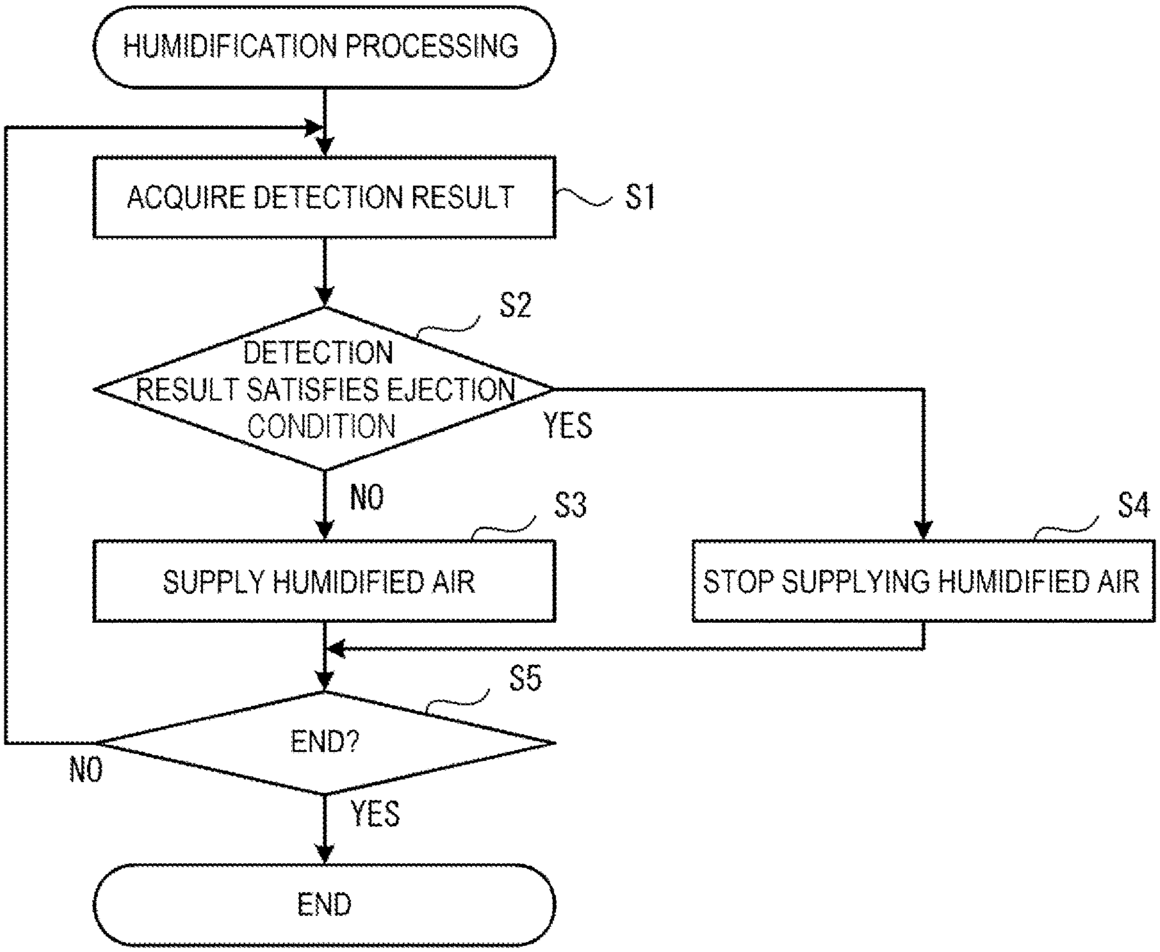
FIG. 10 is a flowchart of humidification processing.

Humidification processing will be described with reference to FIGS. 3A, 9 and 10. The CPU 81 according to the present embodiment controls driving of the fan 862 based on an output result of the sensor 91, and controls the fan 863 based on an output result of the sensor 92. Thereby, the CPU 81 adjusts supply of the humidified air from the humidifier 86, and individually controls a humidity around the sensor

91 detected by the sensor 91 and a humidity around the sensor 92 detected by the sensor 92. Hereinafter, processing of controlling the humidity around the sensor 91 by controlling the driving of the fan 862 based on the output result of the sensor 91 will be described. When power of the printing device 1 is turned on and a start time set by a program is reached, the CPU 81 reads the control program from the ROM 82 and operates to execute the humidification processing. The printing device 1 according to the present embodiment always executes the humidification processing during an operation time set by the operator. By always executing the humidification processing, it is not necessary to wait for a start of printing until the humidity inside the housing 8 increases after a start of humidification. While the humidification processing is being executed, the fans 94, 95 are driven by processing that is separately executed.

The CPU 81 acquires a detection result of the sensor 91 (S1). The CPU 81 determines whether the detection result acquired in S1 satisfies the ejection condition (S2). The ejection condition may include a condition related to at least one of the humidity and the temperature acquired by the sensor 91, and a preset ejection condition is a condition related to at least one of the humidity and the temperature at which the head 30 can stably eject the liquid. For example, the ejection condition related to the humidity may be determined for each temperature. A humidity is represented by a ratio of an amount of water vapor to an amount of saturated water vapor at a temperature of measurement atmosphere. For this reason, for example, the ejection condition may satisfy a condition that an amount of water vapor calculated based on the temperature and the humidity acquired by the sensor 91 is larger than a threshold value. The CPU 81 may determine whether the ejection condition is satisfied based on a detection result of the sensor 93 in addition to the detection result of the sensor 91.

When it is determined that the detection result acquired in S1 does not satisfy the ejection condition (S2: NO), the CPU 81 starts or continues to drive the fan 862, and supplies air humidified by the humidifier 86 from the supply port 75 to the inside of the housing 8 (S3). When the air humidified by the humidifier 86 is supplied from the supply port 75 to the left side space inside the housing 8, the humidity mainly increases in the left side space inside the housing 8 and in a left half of the movement range R of the head 30.

When it is determined that the detection result acquired in S1 satisfies the ejection condition (S2: YES), the CPU 81 stops driving the fan 862 to stop supplying the air humidified by the humidifier 86 from the supply port 75 to the inside of the housing 8 (S4). At this time, since driving of the fan 94 is continued, the air discharged from the exhaust port 946 of the fan 94 moves leftward and upward in the left side space and moves to rightward above the front shaft 21. The CPU 81 determines whether a current time has reached an end time (S5). When the end time has not been reached (S5: NO), the CPU 81 returns the processing to S1. When the end time has been reached (S5: YES), the CPU 81 ends the humidification processing. The humidification processing of controlling the humidity around the sensor 92 by controlling driving of the fan 863 based on the output result of the sensor 92 is executed in the same manner as the humidification processing of controlling the humidity around the sensor 91. Thereby, the CPU 81 can individually adjust supply of the humidified air from the supply ports 75, 76 and a stop of the supply according to values from the sensors 91, 92.

As shown in FIG. 3A, the printing device 1 according to the above embodiment includes the housing 8 (see FIG. 1), the head 30, the fans 94, 95, the humidifier 86, and the filter 480. The head 30 is arranged inside the housing 8 and ejects the liquid. The fans 94, 95 are arranged inside the housing 8. The humidifier 86 supplies the humidified air to the supply port 75 arranged on the side of the exhaust port 946 (left side) of the fan 94. That is, the supply port 75 may not be arranged in the middle of a path of the air from the head 30 toward the suction port 945 of the fan 94, but may be arranged in the middle of a path of the air from the exhaust port 946 of the fan 94 toward the head 30. The humidifier 86 supplies the humidified air to the supply port 76 arranged on the side of the exhaust port 956 (right side) of the fan 95. Similarly, the supply port 76 may not be arranged in the middle of a path of the air from the head 30 toward the suction port 955 of the fan 95, but may be arranged in the middle of a path of the air from the exhaust port 956 of the fan 95 toward the head 30.

The filter 480 of the mist collection mechanism 73 is arranged on the side of the fan 94 with respect to the supply port 75. That is, the filter 480 of the mist collection mechanism 73 may be arranged between the exhaust port 946 and the supply port 75 in the path of the air from the exhaust port 946 of the fan 94 toward the head 30, or may be arranged in the path of the air from the head 30 toward the suction port 945 of the fan 94. The filter 480 of the mist collection mechanism 74 is arranged on a side of the fan 95 with respect to the supply port 76. That is, the filter 480 of the mist collection mechanism 74 may be arranged between the exhaust port 956 and the supply port 76 in the path of the air from the exhaust port 956 of the fan 95 toward the head 30, or may be arranged in the path of the air from the head 30 toward the suction port 955 of the fan 95. Thereby, the air supplied from the humidifier 86 merges with the air sent from the exhaust port 946 of the fan 94 and the air sent from the exhaust port 956 of the fan 95, and is sent to the head 30. Therefore, since the head 30 is arranged in a humidification environment, the drying of the liquid in the head 30 is prevented, and a possibility of occurrence of ejection failure of the liquid from the head 30 can be reduced.

The fans 94, 95 are arranged inside the housing 8. Thereby, when the humidifier 86 and the fans 94, 95 are driven, the air sent from the exhaust port 946 of the fan 94 and the exhaust port 956 of the fan 95 causes the inside of the housing 8 to have a positive pressure, and a flow of the air from the inside to the outside of the housing 8 is likely to be generated. Therefore, a possibility that the dust or the like is sucked into the housing 8 from the outside of the housing 8 can be reduced. Further, the filter 480 of the mist collection mechanism 73 is arranged on the fan side of the fan 94 from the supply port 75, and the filter 480 of the mist collection mechanism 74 is arranged on the fan side of the fan 95 from the supply port 76. Thereby, the mist of the liquid ejected from the head 30 is collected by the filter 480, so that the mist is less likely to be mixed with the humidified air supplied from the supply ports 75, 76. Therefore, it is possible to reduce a possibility that the head 30 is contaminated by the mist as compared with a device in which the filter 480 is not provided on the fan side of the fan 94 from the supply port 75 and the filter 480 is not provided on the fun side of the fan 95 from the supply port 75.

The fans 94, 95 are arranged in the liquid ejection direction side of the head 30. The mist generated when the liquid is ejected from the head 30 tends to gather in the ejection direction side of the head 30. Therefore, as compared with a case where the fans 94, 95 are provided on a side opposite to the liquid ejection direction of the head 30, the air inside the housing 8 containing the mist is efficiently sent to the filter 480 by the fans 94, 95.

The filters 480 of the printing device 1 are arranged in the path from the head 30 toward the suction port 945 of the fan 94 and the path from the head 30 toward the suction port 955 of the fan 95, respectively. One filter 480 collects the mist in the air by the head 30 in the path from the head 30 toward the suction port 945 of the fan 94, and the other filter 480 collects the mist in the air by the head 30 in the path from the head 30 toward the suction port 955 of the fan 95. Thereby, the mist is less likely to adhere to the fans 94, 95 as compared with a case where one filter 480 is provided between the supply port 75 and the exhaust port 946 of the fan 94 and the other filter 480 is provided between the supply port 76 and the exhaust port 956 of the fan 95.

The printing device 1 includes the conveyance mechanism 14 and inner walls 71, 72. The conveyance mechanism 14 conveys the platen 12, on which the printing medium is arranged, between the internal position of the housing 8 and the outside of the housing 8 through the platen opening 13 (see FIG. 1) provided in the housing 8 on the sub-scanning direction side. The inner walls 71, 72 are arranged to face each other in a direction intersecting the sub-scanning direction at the internal position of the housing 8. The fan 94 is provided on the inner wall 71. The fan 95 is provided on the inner wall 72. Thereby, the mist is not directed from the head 30 to the platen 12, but is easily directed from the head 30 to the fan 94. Therefore, a possibility that the mist adheres to the printing medium arranged on the platen 12 can be reduced.

The printing device 1 includes fans 94, 95 provided on the inner walls 71, 72, respectively, and filters 480 provided corresponding to the fans 94, 95, respectively. The fan 94 is provided on the inner wall 71, and the fan 95 is provided on the inner wall 72. Thereby, on one side (left side) in the main scanning direction of the platen 12 arranged at the internal position P of the housing 8, a flow of the air from the exhaust port 946 of the fan 94 toward the head 30 and a flow of the air from the head 30 toward the suction port 945 of the fan 94 are generated. On the other side (right side) in the main scanning direction of the platen 12 arranged at the internal position P of the housing 8, a flow of the air from the exhaust port 956 of the fan 95 toward the head 30 and a flow of the air from the head 30 toward the suction port 955 of the fan 95 are generated. Therefore, the dust is not sucked into the housing 8 from the platen opening 13 having a length in the main scanning direction larger than that of the platen 12, and a possibility that the dust reaches the head 30 can be reduced.

As shown in FIG. 2A, the printing device 1 includes the movement mechanism 77 that moves the head 30 in the main scanning direction. As shown in FIGS. 3A to 3C, the exhaust port 946 of the fan 94 and the exhaust port 956 of the fan 95 are located at the ejection direction side of the head 30 arranged within the movement range R of the head 30 in the main scanning direction. Therefore, the fans 94, 95 can be arranged close to the head 30, and the air inside the housing 8 containing the mist can be efficiently sent to the filter 480. In addition, the fans 94, 95 can efficiently send the humidified air to the head 30 within the movement range R.

When the head 30 moves, the mist easily moves together with the head 30. The exhaust port 946 of the fan 94 is located at the ejection direction side of the head 30 arranged at one end portion (left end portion) of the head 30 within the movement range R in the main scanning direction. The exhaust port 956 of the fan 95 is located at the ejection direction side of the head 30 arranged at the other end portion (right end portion) of the head 30 within the movement range R in the main scanning direction. Thereby, each of the fans 94, 95 can efficiently send the mist that moves together with the head 30 to the filter 480.

The printing device 1 includes the first maintenance mechanism 4 and the second maintenance mechanism 5 that are provided at positions facing the head 30 arranged on the left end side of the movement range R of the head 30 and maintain the head 30. The exhaust port 946 of the fan 94 is arranged at a position facing the head 30 arranged on the left end side of the movement range R of the head 30, and is arranged at the ejection direction side from the first maintenance mechanism 4 and the second maintenance mechanism 5. The fan 94 is provided on a left end side in the main scanning direction where the first maintenance mechanism 4 and the second maintenance mechanism 5 are provided, and the exhaust port 946 is arranged at the ejection direction side from the first maintenance mechanism 4 and the second maintenance mechanism 5. While the head 30 is maintained by the first maintenance mechanism 4 or the second maintenance mechanism 5, the humidified air can be sent to the head 30, so that the drying of the liquid in the head 30 during maintenance can be prevented. Further, by sending the humidified air to the first maintenance mechanism 4, atmosphere around the first maintenance mechanism 4 and the second maintenance mechanism 5 can be humidified, and drying of moisture-bearing members such as the foam wiper 611 can be prevented.

The printing device 1 includes sensors 91, 92 that are provided inside the housing 8 and detect at least one of the humidity and the temperature inside the housing 8, and a CPU 81. The CPU 81 adjusts the supply of the humidified air from the humidifier 86 based on the detection result of the sensor 91. That is, when it is determined that at least one of the humidity and the temperature inside the housing 8 does not satisfy the ejection condition based on the detection result of the sensor 91 (S2: NO), the CPU 81 supplies the air humidified by the humidifier 86 from the supply port 75 to the inside of the housing 8 (S3). When it is determined that the detection result satisfies the ejection condition (S2: YES), the CPU 81 stops supplying the air humidified by the humidifier 86 from the supply port 75 to the inside of the housing 8 (S4). Similarly, the CPU 81 adjusts the supply of the humidified air from the humidifier 86 based on the detection result of the sensor 92. That is, when it is determined that at least one of the humidity and the temperature inside the housing 8 does not satisfy the ejection condition based on the detection result of the sensor 92 (S2: NO), the CPU 81 supplies the air humidified by the humidifier 86 from the supply port 76 to the inside of the housing 8 (S3). When it is determined that the detection result satisfies the ejection condition (S2: YES), the CPU 81 stops supplying the air humidified by the humidifier 86 from the supply port 76 to the inside of the housing 8 (S4). Therefore, the CPU 81 can efficiently drive the humidifier 86 by stopping the supply of the humidified air when the ejection condition is satisfied.

The first maintenance mechanism 4 and the second maintenance mechanism 5 are provided between the partition plate 28 in which the supply port 75 is formed and the head 30 arranged at the maintenance position B1. On the other hand, the first maintenance mechanism 4 and the second maintenance mechanism 5 are not arranged between the partition plate 29 in which the supply port 76 is formed and the head 30 arranged at the head standby position B3. Therefore, when the humidified air is supplied from the supply ports 75, 76 in the same manner, the humidity in the left side space and the humidity in the right side space may be different from each other. By individually switching the supply of the humidified air from the supply ports 75, 76 according to the values from the sensors 91, 92, the CPU 81 can prevent the humidity in the left side space and the humidity in the right side space from being different from each other.

The present disclosure can be variously modified from the above embodiment. Various modifications described below can be combined with each other. The number, arrangement, configuration and the like of the heads 30 of the printing device 1 may be changed as appropriate. The printing device 1 may not include the movement mechanism 77 and may include a line head having a length equal to or larger than the length of the platen 12 in the main scanning direction. A type of the liquid ejected from the head 30 may be changed as appropriate. Each of the main scanning direction, the sub-scanning direction and the ejection direction of the printing device 1 may be appropriately changed in any direction of the printing device 1 according to a configuration of the printing device 1. The humidifier 86 may be provided outside the housing 8 or may be provided at any position inside the housing 8. The number of the humidifiers 86 may correspond to the number of the supply ports 75, 76. That is, the printing device 1 may include, for example, a first humidifier 86 that supplies humidified air to the supply port 75 and a second humidifier 86 that supplies humidified air to the supply port 76.

The shapes, numbers and arrangements of the fans 94, 95, the supply ports 75, 76 and the filter 480 may be changed as appropriate. At least one of the inner walls 71, 72 may be omitted, or the configuration and arrangement thereof may be appropriately changed. For example, the printing device 1 may include one or more fans inside the housing 8, and any one of the fans 94, 95 may be omitted. Although three fans 94 are arranged in the front-rear direction, the number of the fans 94 may be four or more, or may be two or less. The number of the fans 94 and the number of the fans 95 may be the same as each other or may be different from each other. The fan may be provided on only one of the inner walls 71, 72. At least one of the fans 94, 95 may be provided in a space other than the inner walls 71, 72 (for example, the left side space or the right side space). The supply port 75 may be provided between the fan 94 and the head 30.

At least one of the configurations and the arrangements of the first maintenance mechanism 4 and the second maintenance mechanism 5 may be changed. For example, the first maintenance mechanism 4 may be arranged below the head 30 arranged at the left end portion of the movement range R, and the second maintenance mechanism 5 may be arranged below the head 30 arranged at the right end portion of the movement range R.

At least one of the sensors 91 to 93 may be omitted, and at least one of the type, number and arrangement of the sensors 91 to 93 may be appropriately changed. The number of the sensors 91, 92 may be different from the number of the supply ports 75, 76. The sensors 91, 92 may not be provided on a head side from the supply ports 75, 76.

The program executed by the CPU 81 may be received from other devices via a cable or wireless communication and stored in a nonvolatile storage device. Other devices include, for example, a PC and a server connected via a network.

A part or all of the humidification processing executed by the printing device 1 may be executed by an electronic device (for example, an ASIC) different from the CPU 81. The processing executed by the printing device 1 may be distributed processing by a plurality of electronic devices (for example, a plurality of CPUs). An order of steps of the processing executed by the printing device 1 can be changed, the steps can be omitted, and the steps can be added as necessary. A scope of the present disclosure also includes an aspect in which an operating system (OS) or the like running on the printing device 1 executes a part or all of each processing according to a command from the CPU 81.

The CPU 81 may constantly supply the humidified air from the supply ports 75, 76, or may alternately switch between supplying the humidified air and stopping the supply at a predetermined timing, regardless of the detection results of the sensors 91 to 93. A timing at which the humidification processing in FIG. 10 is performed may be changed to any timing in consideration of usage conditions of the printing device 1 and the like. The CPU 81 may control both whether the humidified air is supplied from the supply port 75 and whether the humidified air is supplied from the supply port 76 based on the detection result of at least one of the sensors 91 to 93. The CPU 81 may control a supply amount of the humidified air supplied from the supply ports 75, 76 by controlling a drive amount of the fans 862, 863, or may control at least one of the temperature and the humidity of the humidified air supplied from the supply ports 75, 76 by controlling a drive amount of the humidification drive unit 861, in accordance with whether at least one of the detection results of the sensors 91 to 93 satisfies the ejection condition.

What is claimed is:

1. A printing device comprising:
- a housing;
- a head arranged inside the housing and configured to eject a liquid;
- a fan arranged inside the housing;
- a humidifier configured to supply humidified air to a supply port arranged at an exhaust port side of the fan;
- a filter arranged at a fan side of the supply port;
- a conveyance mechanism configured to convey a platen on which a medium is arranged between an internal position of the housing and outside of the housing through a platen opening provided on a sub-scanning direction side of the housing;
- a pair of inner walls arranged to face each other in a direction intersecting the sub-scanning direction at the internal position; and
- a maintenance mechanism configured to maintain the head, wherein the fan is arranged at an ejection direction side of the liquid from the head, and wherein in a main scanning direction perpendicular to the sub-scanning direction,
- the supply port is positioned between the maintenance mechanism and one of the pair of inner walls,
- the exhaust port of the fan is positioned between the supply port and the one of the pair of inner walls, and
- the exhaust port is configured to exhaust air therethrough toward the maintenance mechanism to allow the humidified air to be supplied to the maintenance mechanism.

2. The printing device according to claim 1, wherein the filter is arranged in a path from the head to a suction port of the fan.

3. The printing device according to claim 1, wherein the fan is provided on the one of the pair of inner walls.

4. The printing device according to claim 3, further comprising:

a pair of the fans, each of which is provided on a respective one of the inner walls; and a pair of the filters, each of which corresponds to a respective one of fans.

5. The printing device according to claim 1, further comprising:

a movement mechanism configured to move the head in a main scanning direction, wherein the exhaust port of the fan is located in an ejection direction side of the head arranged within a movement range of the head.

6. The printing device according to claim 5, wherein the maintenance mechanism is provided at a position facing the head arranged on one end side of the movement range, and wherein the exhaust port of the fan is arranged at the position facing the head arranged on the one end side of the movement range and at the ejection direction side from the maintenance mechanism.

7. The printing device according to claim 1, further comprising:

a sensor provided inside the housing and configured to detect at least one of a humidity and a temperature inside the housing; and a controller configured to, based on a detection result of the sensor, perform supplying the air humidified by the humidifier to the inside of the housing from the supply port when at least one of the humidity and the temperature inside the housing does not satisfy an ejection condition, and stop supplying the air humidified by the humidifier to the inside of the housing from the supply port when the ejection condition is satisfied.

8. The printing device according to claim 1, wherein the head is configured to eject the liquid in an ejection direction, and wherein the filter is arranged between the fan and the head in the ejection direction.

* * * * *